(12) United States Patent
Augustine et al.

(10) Patent No.: US 6,922,620 B2
(45) Date of Patent: Jul. 26, 2005

(54) ACTUATOR SYNCHRONIZATION AND LOCKING CONCEPT FOR STEER BY WIRE APPLICATIONS

(75) Inventors: Michael J. Augustine, Mayville, MI (US); David W. Graber, Millington, MI (US); Jens Haupt, Gross Gerau (DE)

(73) Assignee: Delphi Technologies, Inc., Troy, MI (US)

( * ) Notice: Subject to any disclaimer, the term of this patent is extended or adjusted under 35 U.S.C. 154(b) by 244 days.

(21) Appl. No.: 10/008,344

(22) Filed: Nov. 6, 2001

(65) Prior Publication Data

US 2003/0088351 A1 May 8, 2003

(51) Int. Cl.[7] .................................................. G06F 7/00
(52) U.S. Cl. ...................... 701/41; 180/411; 180/444; 701/43
(58) Field of Search ............................. 701/29, 31, 34, 701/36, 41–43, 1; 33/203, 203.18; 180/402, 406, 411, 444, 412, 6.2, 6.6, 6.44, 443, 446

(56) References Cited

U.S. PATENT DOCUMENTS

| | | | | |
|---|---|---|---|---|
| 4,865,144 | A | * | 9/1989 | North |
| 5,096,014 | A | | 3/1992 | Abe et al. .................. 180/140 |
| 5,951,031 | A | * | 9/1999 | Shimizu et al. |
| 6,098,296 | A | * | 8/2000 | Perisho, Jr. et al. |
| 6,176,341 | B1 | | 1/2001 | Ansari ........................ 180/402 |
| 6,283,243 | B1 | * | 9/2001 | Bohner et al. |
| 6,311,634 | B1 | * | 11/2001 | Ford et al. |
| 6,318,494 | B1 | * | 11/2001 | Pattok |
| 6,481,526 | B1 | | 11/2002 | Millsap et al. |
| 6,484,839 | B2 | | 11/2002 | Cole |
| 6,606,561 | B2 | * | 8/2003 | Flick ......................... 701/213 |
| 6,625,530 | B1 | | 9/2003 | Bolourchi |

FOREIGN PATENT DOCUMENTS

| | | |
|---|---|---|
| DE | 196 01 827 A1 | 1/1996 |
| DE | 199 18 355 A1 | 4/1999 |
| JP | 10236329 | 8/1998 |
| WO | WO 00/50290 | 8/2000 |

OTHER PUBLICATIONS

European Search Report dated Aug. 7, 2003.

* cited by examiner

Primary Examiner—Michael J. Zanelli
(74) Attorney, Agent, or Firm—Michael D. Smith

(57) ABSTRACT

A steer-by-wire system for a vehicle that provides synchronization capability to an actuator of a steerable device and an actuator of a steering input device includes a steering input device actuator operably connected to the steering input device of the vehicle and a steerable device actuator operably connected to the steerable device of the vehicle. The steerable device actuator is disposed in electronic communication with the steering input device actuator. The electronic communication is defined such that synchronous positioning of the steering input device actuator and the steerable device actuator can be effectuated by the system upon startup of the vehicle. A method of using the system includes initiating operation of the system by turning on an ignition switch of the vehicle and evaluating an initial condition of the vehicle. The initial condition is associated to the positions of the steering input device actuator and the steerable device actuator.

21 Claims, 5 Drawing Sheets

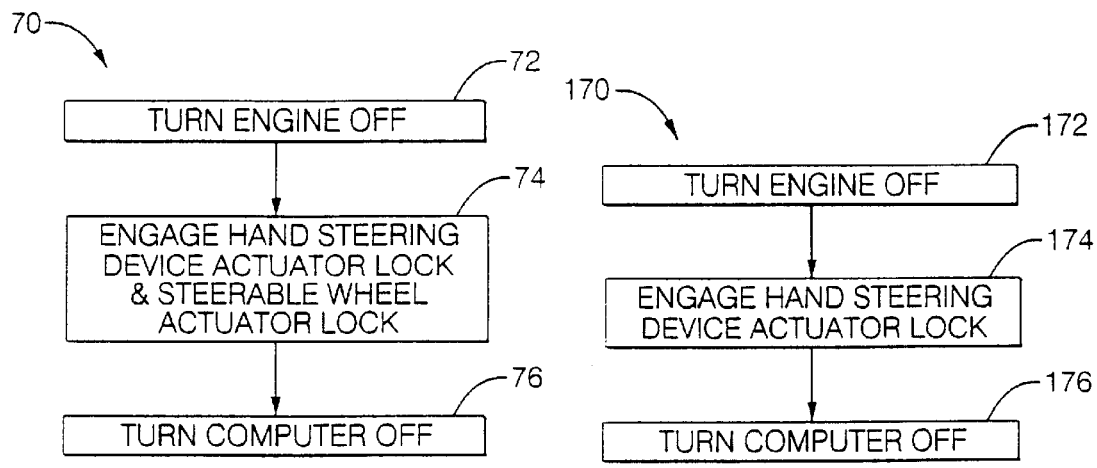
FIG. 5
FIG. 8
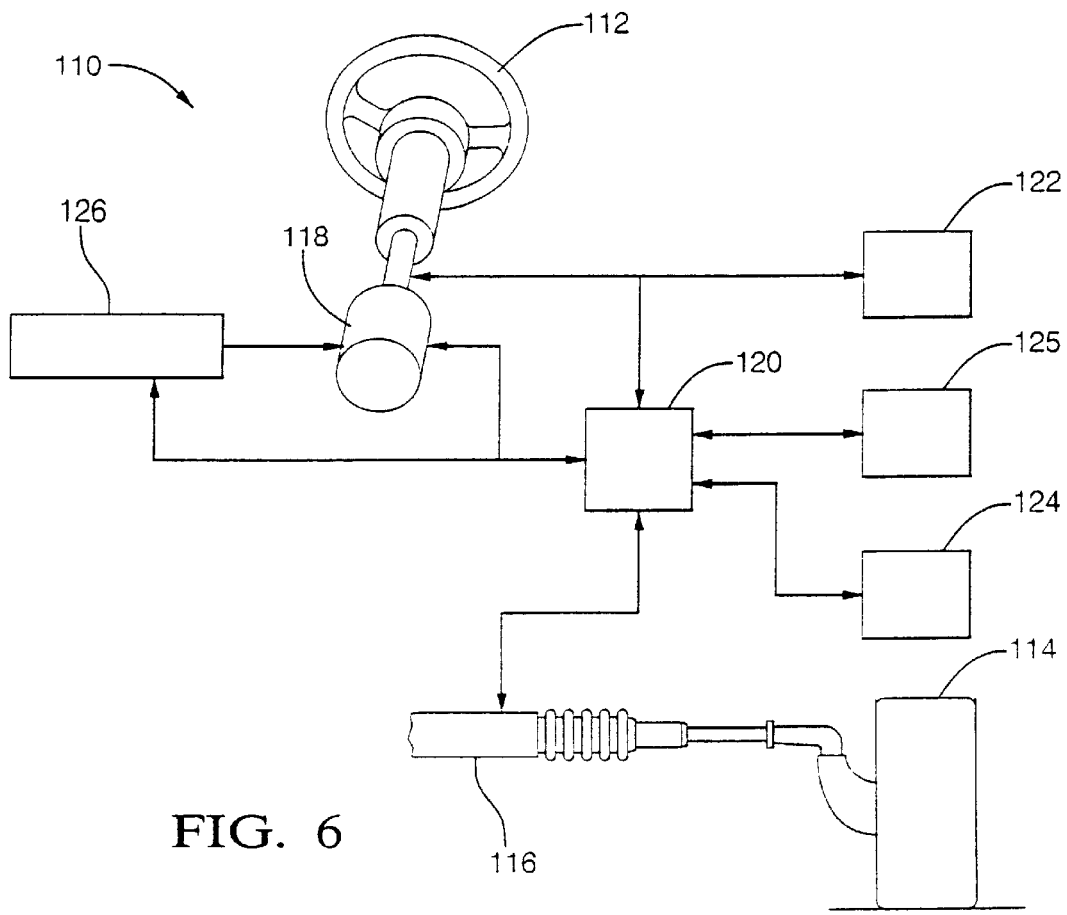
FIG. 6

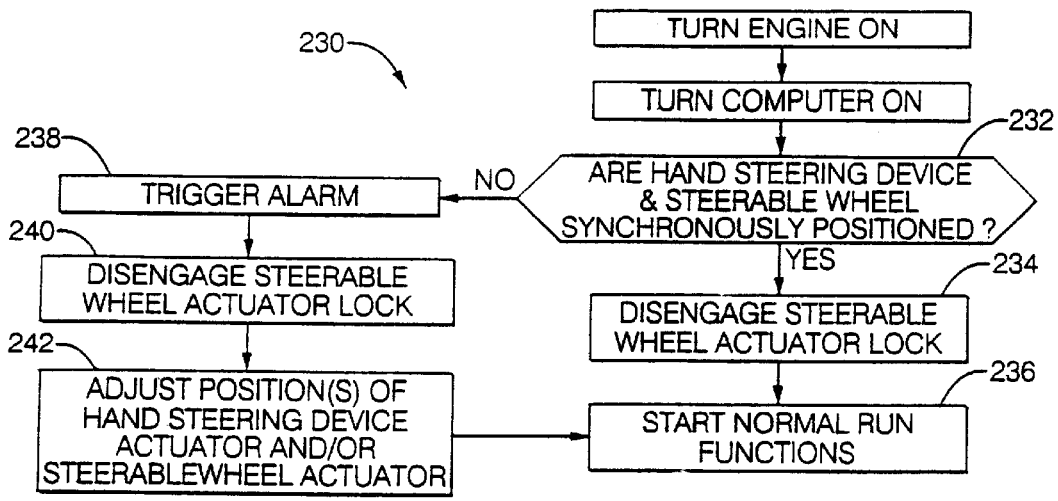
FIG. 10
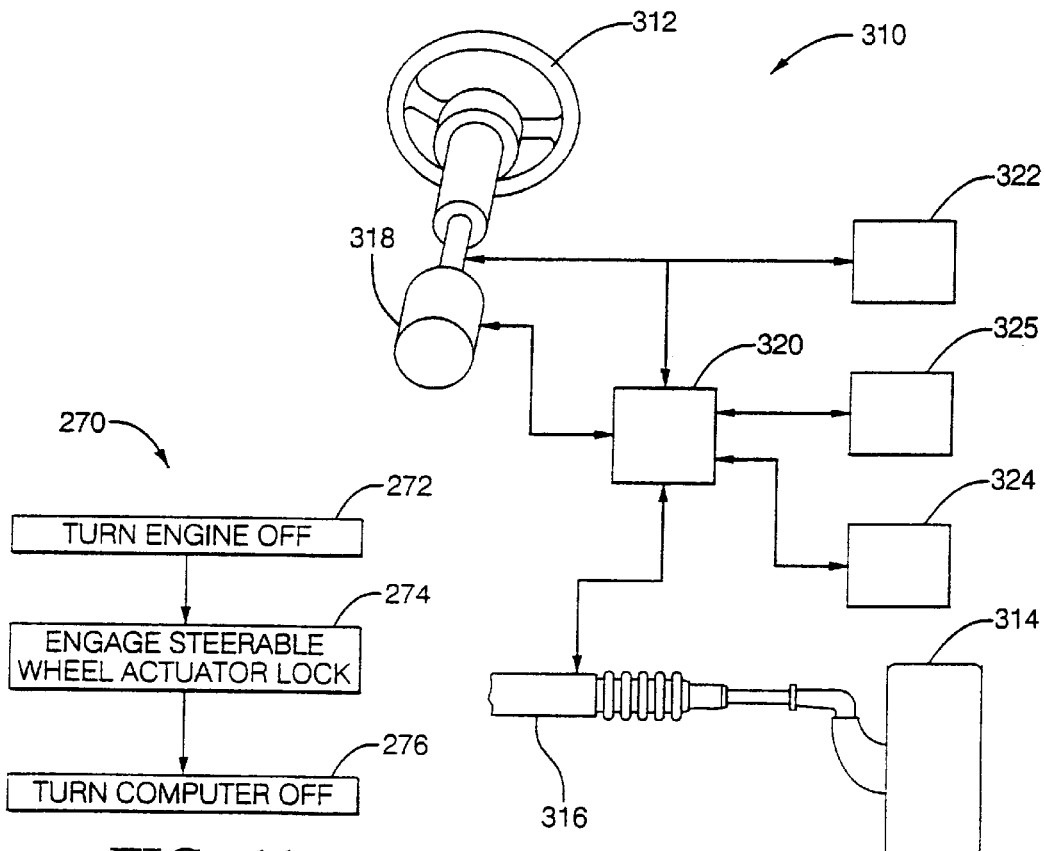
FIG. 11
FIG. 12

US 6,922,620 B2

ACTUATOR SYNCHRONIZATION AND LOCKING CONCEPT FOR STEER BY WIRE APPLICATIONS

BACKGROUND

In a "steer-by-wire" system that provides directional control to a vehicle, the displacement of a steering input device is detected by a sensor and converted into an electrical signal. The electrical signal is processed and applied to motor-operated steerable device actuator attached to a steerable device of the vehicle (wheels, skis, nozzles, jets, propellers, etc.), which are then moved according to the signal received by the motor.

The absence of mechanical linkage between the steering input device and the steerable device actuator allows space that would otherwise be occupied by the mechanical linkage to be utilized in a more efficient manner. Because of the lack of mechanical communication between the steerable device and the steering input device, however, the steerable device and the steering input device may be independently manipulated when the vehicle is non-operational. If either or both the steering input device and the steerable device are manipulated when the vehicle is non-operational, the actuators for the respective steering input device and the steerable device may be out of synchronization with each other upon start up of the vehicle. Consequently, the actuators may require adjustment prior to operation of the vehicle. Such adjustment may include repositioning of the steering input device to correspond with the position of the steerable device actuators, alignment of the steerable device actuators to correspond with the position of the steering input device, or both the repositioning of the steering input device and the alignment of the steerable device.

SUMMARY

A steer-by-wire system for a vehicle that provides synchronization capability to an actuator of a steerable device and an actuator of a steering input device is described herein. The system includes the steering input device actuator operably connected to the steering input device of the vehicle and the steerable device actuator operably connected to the steerable device of the vehicle. The steerable device actuator is disposed in electronic communication with the steering input device actuator. The electronic communication is defined such that synchronous positioning of the steering input device actuator and the steerable device actuator can be effectuated by the system upon startup of the vehicle.

A method of using the system includes activating the system by turning on an ignition switch and evaluating an initial condition of the vehicle. The initial condition is associated to the positions of the steering input device and the steerable device (e.g., steerable wheels) as registered by the steering input device actuator and the steerable device actuator and evaluated by a control unit with regard to an embedded predefined relationship.

BRIEF DESCRIPTION OF THE DRAWINGS

FIG. 5 is a flowchart representation of the shutdown of a system for a vehicle that provides synchronization between an actuator of a steerable device and an actuator of a steering input device and locking capability for the actuators.

FIG. 6 is a schematic representation of a system for a vehicle that provides locking capability to an actuator of a steering input device and synchronization between an actuator of the steering input device and an actuator of the steerable device.

FIG. 8 is a flowchart representation of the shutdown of a system for a vehicle that provides locking capability to an actuator of a steering input device and synchronization between the actuator of the steering input device and an actuator of a steerable device.

FIG. 10 is a flowchart representation of the startup of a system for a vehicle that provides locking capability to an actuator of a steerable device and in which either the actuator of the steerable device or an actuator of a steering input device or a combination thereof is adjusted to synchronously position the steerable device and the steering input device.

FIG. 11 is a flowchart representation of the shutdown of a system for a vehicle that provides locking capability to an actuator of a steerable device and synchronization between an actuator of a steering input device and the actuator of the steerable device.

FIG. 12 is a schematic representation of a system for a vehicle having synchronization capability between an actuator of a steering input device and an actuator of a steerable device and having no locking capability of either or both the actuator of the steering input device and the actuator of the steerable device.

DETAILED DESCRIPTION

Figure 1:
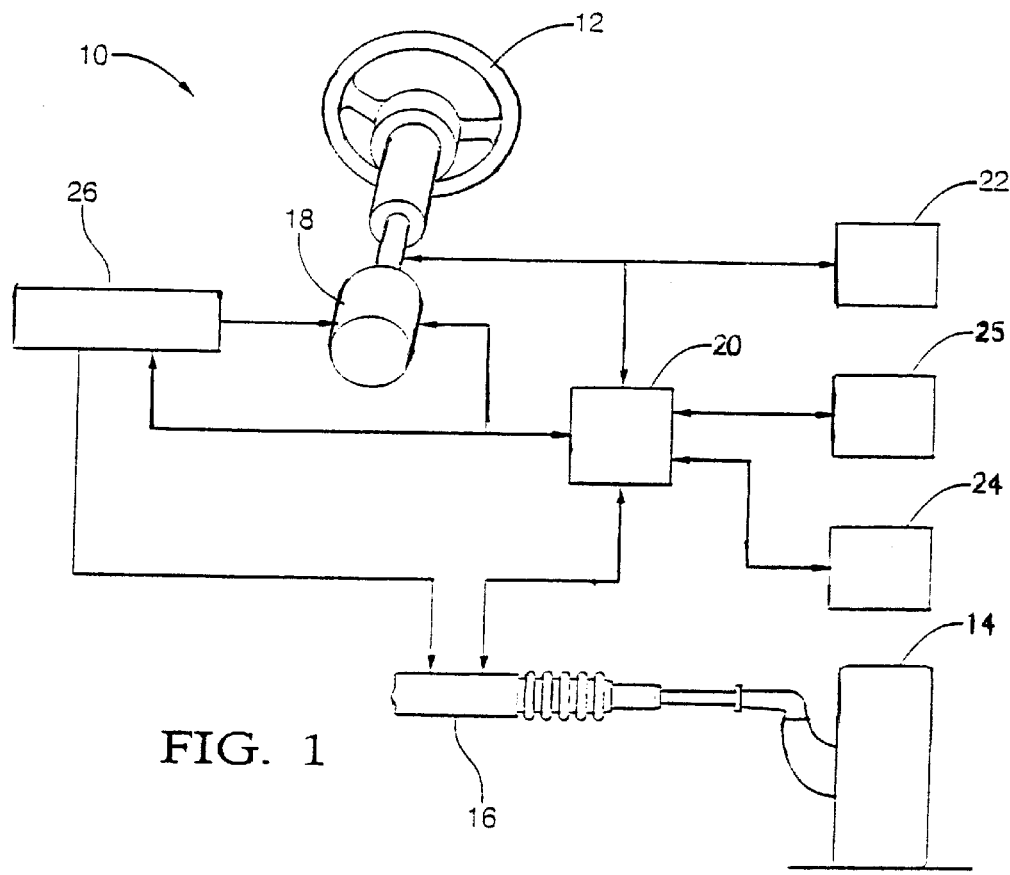
FIG. 1 is a schematic representation of a system for a vehicle that provides synchronization between an actuator of a steerable device and an actuator of a steering input device and locking capability for said actuators.

Referring to FIG. 1, an exemplary system for establishing and maintaining synchronous control of a steerable device and a steering input device for vehicles having steer-by-wire capability is shown at 10 and is hereinafter referred to as "system 10." System 10 provides for the locking and synchronizing of an actuator of the steerable device and an actuator of the steering input device. In particular, system 10 is configured to inhibit relative movement between the steering input device and the steerable device when a vehicle (not shown) having steer-by-wire capability into which system 10 is incorporated is non-operational. Synchronizing adjustments are provided for upon startup of the vehicle in order to ensure proper alignment of the steerable device with the steering input device. Some of the applications into which system 10 may be incorporated include, but are not limited to, automotive, marine, aircraft systems, and industrial equipment.

System 10 comprises a steering input device 12 disposed in controllable communication with the steerable device, which, in one exemplary embodiment, is a pair of steerable wheels 14. Although system 10 is hereinafter described as including at least a pair of steerable wheels, it should be understood by one of ordinary skill in the art that system 10 is incorporable into vehicles in which only a single wheel is steerable, into vehicles in which two or more wheels are independently steerable, or into vehicles that develop steering control through means other than wheels. Means for developing steering control other than wheels include, but are not limited to, propellers, directional nozzles, skis, and similar devices. The controllable communication between steerable wheels 14 and steering input device 12 is effectuated through steerable wheel 14 disposed in mechanical communication with a steerable wheel actuator 16, an electronic connection maintained between steerable wheel actuator 16 and a steering input device actuator 18, and a mechanical connection between steering input device actuator 18 and steering input device 12. The electronic communication between actuators 16, 18 is maintained through a control unit 20. Control unit 20 is actuatably disposed in electronic communication with a switching device 22 and an alarm 24. Switching device 22 may be an ignition switch. Control unit 20 is furthermore generally integrated with a computer 25. An exemplary locking system 26 is in operable communication with both steering input device actuator 18 and steerable wheel actuator 16 to lock both steering input device 12 and steerable wheel 14 into whichever position actuators maintain at the point of shutdown of system 10.

Locking system 26 is automatically engaged during the vehicle shutdown procedure and is configured to prevent the articulation of steerable wheel actuator(s) 16 under gravity or startup conditions, thereby preventing the unexpected motion of the vehicle. Upon engagement of locking system 26 at vehicle shutdown, each actuator 16, 18 is retained in a pre-defined relationship with the other. Locking system 26 may be actuated by, e.g., a hydraulic system, a mechanical system, an electrical system, an electro-mechanical system, or any other type of system capable of providing lockability. In the actuation of any of the foregoing systems, the engagement of the locking of actuators 16, 18 may be effected by means that include, but are not limited to, a friction braking device, a lockable gear set, a non-backdrivable motor disposed at a gear set, and the actuation of a magneto-rheological fluid.

Regardless of the type of means for engaging locking system 26, because locking system 26 is in controllable communication with control unit 20, locking system 26 is automatically disengaged upon the turning on of ignition switch 22 and startup of system 10 in preparation for operation of the vehicle, as is described below and illustrated with reference to FIG. 2. Alternatively, locking system 26 can be disengaged manually via operator articulation of an interface device (not shown) disposed in communication with locking system 26.

Locking system 26 further incorporates a failsafe mechanism (not shown) that prevents the inadvertent locking of steering input device actuator 18 or steerable wheels actuator(s) during operation of the vehicle. The failsafe mechanism is configured to provide communication between steering input device actuator 18 and steerable wheels actuator(s) 16 in the event that the failsafe mechanism is engaged. The engagement is generally caused through an operator interface device with ignition switch 22, such as the presence of a key (not shown) disposed therein. System 10 can be configured such that locking system 26 is prevented from being engaged in the absence of the removal of the operator interface device from ignition switch 22. The failsafe mechanism may be made operable through means that include, but are not limited to, mechanical, electronic, or optical configurations or a combination thereof.

Alarm 24 is provided in system 10 and is configured to alert the operator of the vehicle of situations in which the position of steering input device 12 does not correspond to the position of steerable wheels 14. Alarm 24 may be any type of warning device including, but not being limited to, a light (not shown) positioned to provide optical feedback to the operator, a sound that provides audio feedback to the operator, a switch (not shown) that renders the vehicle temporarily inoperative, or any combination thereof. Triggering of alarm 24 may signal control unit 20 that a "ramping up" of system 10 is desirable in order to operate the vehicle. During such a ramping up period, steering input device 12 and/or steerable wheels 14 are adjusted through the action of their respective actuators and under the command of the control unit to be in synchronization.

Figure 2:
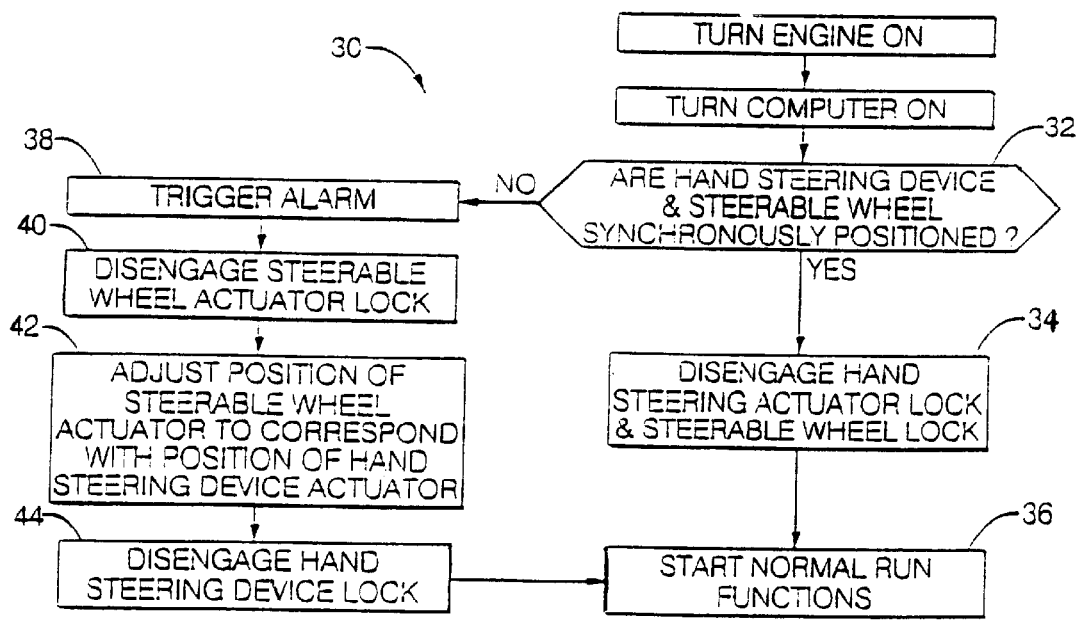
FIG. 2 is a flowchart representation of the startup of a system for a vehicle that provides synchronization between an actuator of a steerable device and an actuator of a steering input device and locking capability for said actuators and in which the actuator of the steerable device is adjusted to comport with the position of the actuator of the steering input device.

Referring now to FIG. 2, a flowchart representation of the startup of the system for the synchronization of the steerable wheel actuator(s) and the steering input device actuator, and hence steerable wheels with steering input device, is illustrated generally at 30. Keeping in mind that the system is incorporated into a vehicle in which the steering input device actuator and the steerable wheels actuator(s) are each disposed in lockable communication with a control unit, the system is initiated by the turning on of the ignition switch and the control unit. The control unit then evaluates an initial condition 32 of the vehicle, viz., whether the steering input device and the steerable wheels are synchronously positioned and corresponding to the positions of their respective actuators. If the steering input device actuator and the steerable wheels actuator(s) are synchronously positioned, then control is passed from initial condition 32 to a command 34 that disengages the locking system that provides locking communication to the steering input device actuator and the steerable wheels actuator(s) and then to a run command 36 from which normal operation of the vehicle is derived.

If, however, the control unit evaluates initial condition 32 and determines that the steering input device and the steerable wheels are not synchronously positioned and corresponding to the positions of their respective actuators, then, in one exemplary embodiment of the system, control is passed to an alarm command 38 and the position of the steerable wheel actuator(s) is adjusted to comport with the position of the steering input device actuator. The adjustment to the steerable wheel actuator(s) comprises an unlock command 40 that disengages the steerable wheel actuator(s) lock, an adjustment command 42 that physically alters the position of the steerable wheel actuator(s) and its corresponding steerable wheels so that synchronization is achieved with the steering input device actuator and hence steering input device, and a disengagement command 44 that disengages the lock on the steering input device actuator. If the vehicle includes independently actuatable steerable wheel actuators, each may be adjusted to align with each other and the steering input device actuator. In either configuration, control is then passed to run command 36 from which normal operation of the vehicle can be derived.

Figure 3:
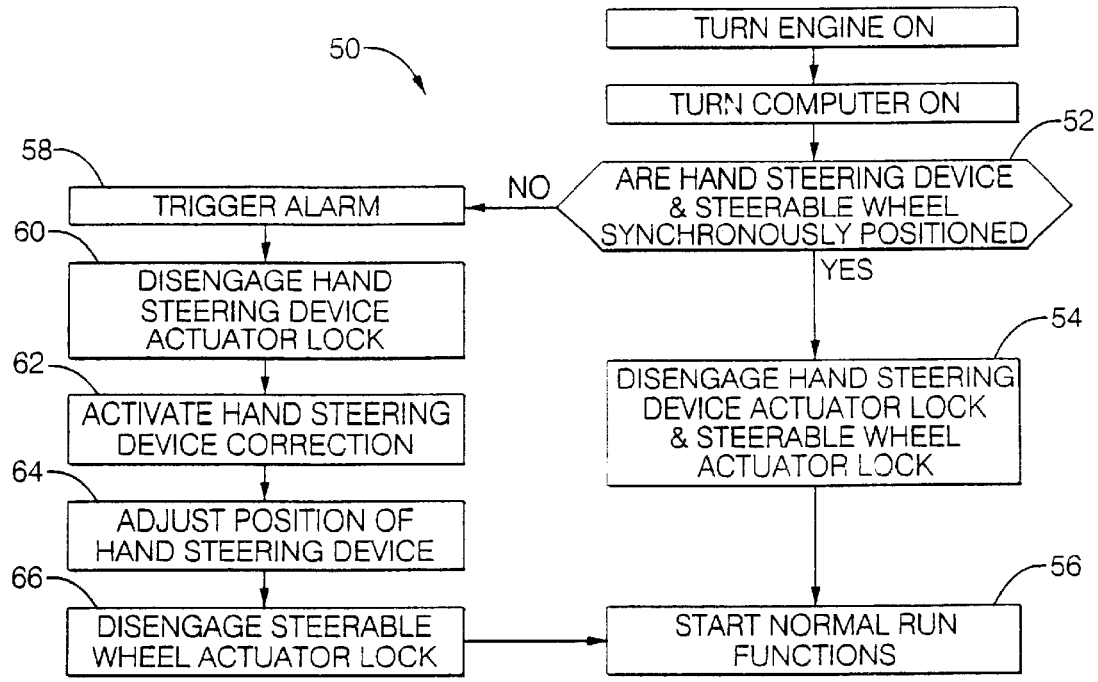
FIG. 3 is a flowchart representation of the startup of a system for a vehicle that provides synchronization between an actuator of a steerable device and an actuator of a steering input device and locking capability for the actuators and in which the actuator of the steering input device is adjusted to comport with the position of the actuator of the steerable device.

Referring to FIG. 3, a similar flowchart representation of the startup of another exemplary embodiment of the system, is illustrated generally at 50 for a similarly configured vehicle. In FIG. 3, however, the steering input device actuator is adjusted to correspond to the position of the steerable wheel actuator(s). As in the procedure outlined in FIG. 2, the system is initiated by the turning on of the ignition switch and the control unit. The control unit evaluates an initial condition 52 as above to determine whether the steering input device and the steerable wheels are synchronously positioned and corresponding to the positions of their respective actuators. If the steering input device actuator and the steerable wheel actuator(s) are synchronously positioned, then control is passed from initial condition 52 to a command 54 that disengages the locking mechanisms that provide locking communication between the control unit and the steering input device actuator and the steerable wheel actuator(s). Control then passes to a run command 56 to operate the vehicle. On the other hand, if the control unit evaluates initial condition 52 and determines that the steering input device and the steerable wheels are not synchronously positioned and corresponding to the positions of their respective actuators, then control is passed to an alarm command 58 and subsequently to a command 60 that disengages the steering input device lock, an input command 62 that is triggered by operator intervention, adjustment command 64 that alters the position of the steering input device actuator, and a disengagement command 66 that disengages the lock on the steerable wheels actuator(s). Finally, control is passed to run command 56 from which normal operation of the vehicle can be derived.

Figure 4:
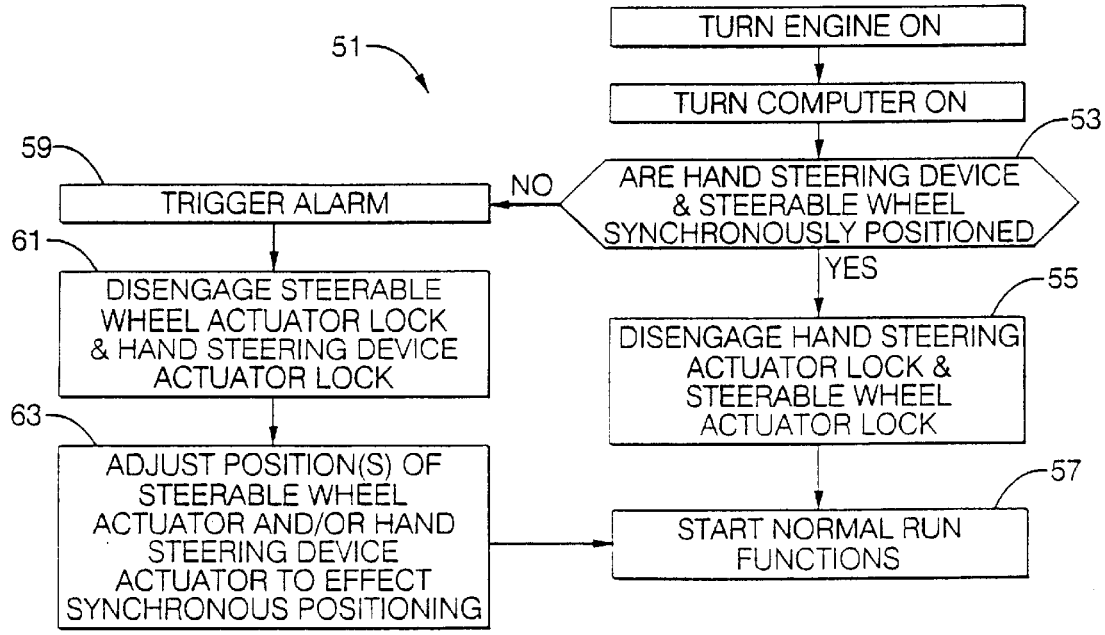
FIG. 4 is a flowchart representation of the startup of a system for a vehicle that provides synchronization between an actuator of a steerable device and an actuator of a steering input device and locking capability for the actuators and in which both the actuators of the steerable device and/or the actuator of the steering input device are adjustable to effect synchronous positioning.

Referring now to FIG. 4, a similar flowchart representation of the startup of yet another exemplary embodiment of the system is illustrated generally at 51 for a similarly configured vehicle. In FIG. 4, both the steering input device actuator and the steerable wheel actuator(s) are adjusted to enable both to be synchronously positioned with respect to each other. As in the procedures outlined in FIGS. 2 and 3, the system is initiated by the turning on of the ignition switch and the control unit. An initial condition 53 is evaluated to determine whether the steering input device and the steerable wheels are synchronously positioned. If they are, then control is passed from initial condition 53 to a command 55 that disengages the locking mechanisms that provide locking communication between the steering input device actuator and the steerable wheels actuator(s). Control is then passed to a run command 57 to operate the vehicle. If, however, initial condition 53 is evaluated such that the steering input device and the steerable wheels are not synchronously positioned, control is passed to an alarm command 59 and subsequently to a command 61 that disengages both the steering input device actuator lock and the steerable wheel actuator(s) lock. Control is further passed to an adjustment command 63 that alters both the positions of the steerable wheel actuator(s) and the steering input device actuator (to the extent necessary) to effect synchronous positioning of the steerable wheels and the steering input device. Finally, as above, control is passed to run command 57 from which normal operation of the vehicle can be derived.

In FIG. 5, a flowchart representation of the shutdown of the system is illustrated generally at 70. Shutdown 70 comprises a command 72 to turn the ignition switch off, a subsequent command 74 to lock the steering input device actuator and the steerable wheel actuator(s), and a final command 76 to turn the computer off. Command 72 can be executed to turn the ignition switch off only if the vehicle speed is zero.

Referring now to FIG. 6, an exemplary system for locking the actuator of a steering input device is shown generally at 110 and is hereinafter referred to as "system 110." System 110 is configured to inhibit the movement of the steering input device when a vehicle (not shown) having steer-by-wire capability into which system 110 is incorporated is non-operational. Although system 110 is similar in numerous aspects to system 10 as defined with reference to FIGS. 1 through 5 and comprises similar elements, system 110 provides locking capability solely for a steering input device actuator 118. System 110 comprises a steering input device 112, steering input device actuator 118, an exemplary embodiment of a locking mechanism 126, a steerable wheel actuator(s) 116, and a steerable wheel 114. Actuators 116, 118 are disposed in electronic communication with each other through a control unit 120 integrated with a computer 125. System 110 further comprises an ignition switch 122, a failsafe mechanism, and an alarm 124 similar to those described with reference to FIGS. 1 through 5.

Locking mechanism 126 of system 110 is in controllable communication with control unit 120 and inhibits operable communication of steering input device actuator 118. Locking mechanism 126 is configured to retain steering input device actuator 118 in a position as defined by the operator of the vehicle at the point of vehicle shutdown. As above, the engagement of locking mechanism 126 may be effected by standard means such as through the actuation of a hydraulic system, a mechanical system, an electrical system, an electromechanical system, or any other type of system capable of providing lockability of steering input device actuator 118.

Figure 7:
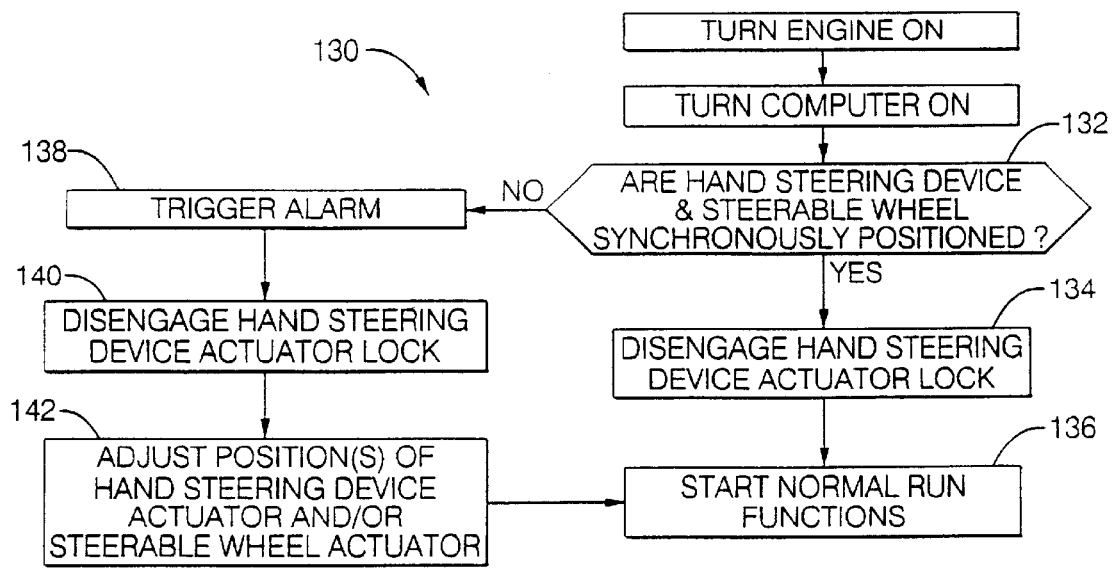
FIG. 7 is a flowchart representation of the startup of a system for a vehicle that provides locking capability to an actuator of a steering input device and in which either an actuator of a steerable device or an actuator of the steering input device or a combination thereof is adjusted to synchronously position the steerable device and the steering input device.

In FIG. 7, a flowchart representation of the startup of system 110 is illustrated generally at 130. Keeping in mind that system 110 is incorporated into a vehicle in which only the steering input device actuator is locked, system 110 is initiated by the turning on of the ignition switch and the control unit. The control unit evaluates an initial condition 132 of the vehicle, viz., whether the steering input device actuator and the steerable wheel actuator(s) are synchronously positioned. If the steering input device actuator and the steerable wheel actuator(s) are synchronously positioned, then control is passed from initial condition 132 to a command 134 that disengages the steering input device actuator lock and then to a run command 136 from which normal operation of the vehicle is derived.

If, however, the control unit evaluates initial condition 132 and determines that the steering input device actuator and the steerable wheel actuator(s) are not synchronously positioned, then control is passed to an alarm command 138, and subsequently to a disengagement command 140 that causes the disengagement of the lock on the steering input device actuator. Control is then passed to an adjustment command 142, which causes the position of the steering input device actuator and/or the position of the steerable wheel actuator to be altered to result in the steering input device, the steering input device actuator, the steerable wheel actuator, and the steerable wheel to be synchronously positioned. Once the steering input device and the steerable wheel are synchronously positioned, control is passed to run command 136 and vehicle is operated.

Adjustment command 142 may be effectuated in any one of a number of different operations. For example, in one operation, adjustment command 142 may cause the steering input device actuator to be adjusted to register with the position of the steerable wheel actuator. In another operation, adjustment command may adjust the steerable wheel actuator to register with the position of the steering input device actuator. In still another operation, one or both the steering input device actuator and the steerable wheel actuator can be adjusted, thereby aligning the steering input device actuator and the steerable wheel actuator to synchronous positions. Furthermore, if the vehicle includes steerable wheels that are independently actuatable, each steerable wheel actuator can be adjusted to align with each other and with the steering input device actuator.

Referring now to FIG. 8, a flowchart representation of the shutdown of system 110 is illustrated generally at 170. Shutdown 170 comprises a command 172 to turn the ignition switch off, a subsequent command 174 to engage a lock on the steering input device actuator, thereby preventing movement of the steering input device and movement of the steering input device actuator, and a final command 176 to turn the computer off. Command 172 can be executed to turn the ignition switch off only if the vehicle speed is zero.

Figure 9:
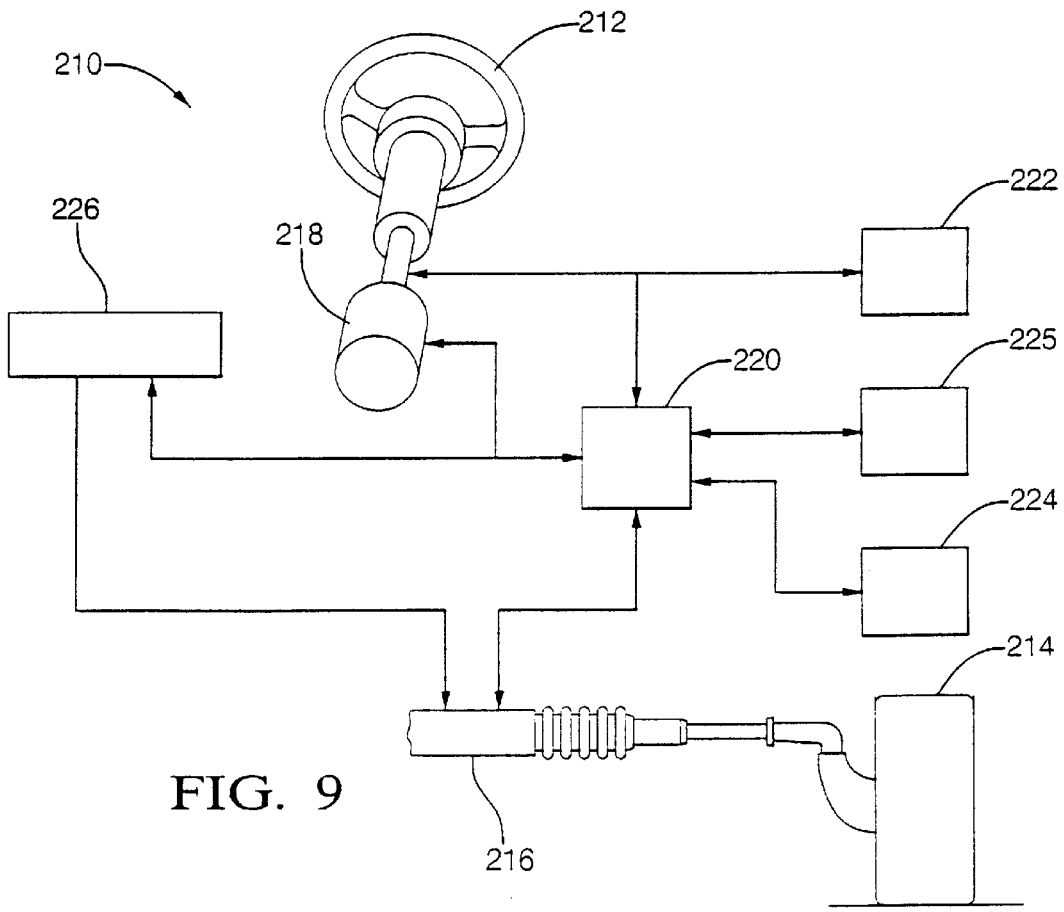
FIG. 9 is a schematic representation of a system for a vehicle that provides locking capability to an actuator of a steerable device and synchronization between an actuator of a steering input device and the actuator of the steerable device.

Referring to FIG. 9, an exemplary system for locking only the actuator(s) of a steerable wheels is shown generally at 210 and is hereinafter referred to as "system 210." System 210 is configured to inhibit the movement of the steerable wheels when a vehicle (not shown) having steer-by-wire capability into which system 210 is incorporated is non-operational. System 210, while similar to system 10 of FIGS. 1 through 5 and to system 110 of FIGS. 6 through 8, provides locking capability solely for a steerable wheel actuator(s) 216. System 210 comprises a steering input device 212, a steering input device actuator 218, a locking mechanism 226, steerable wheel actuator(s) 216, and steerable wheels 214. Actuators 216, 218, as above, are disposed in electronic communication with each other through a control unit 220 integrated with a computer 225. System 210 further comprises an ignition switch 222, a failsafe mechanism, and an alarm 224.

Locking mechanism 226, as above, is in controllable communication with control unit 220 and inhibits the operable communication of steerable wheels actuator(s) 216 and is configured to retain steerable wheels 214 in a position as defined by the operator of the vehicle at the point of vehicle shutdown. The engagement of locking mechanism 226 may be effected by standard means such as through the actuation of a hydraulic system, a mechanical system, an electrical system, an electromechanical system, or any other type of system capable of providing lockability of steerable wheel actuator(s) 216.

A flowchart representation of the startup of system 210 is illustrated generally at 230 in FIG. 10. Keeping in mind that system 210 is incorporated into a vehicle in which only the steerable wheel actuator(s) is locked, system 210 is initiated by the turning on of the ignition switch and the control unit. The control unit evaluates an initial condition 232 of the vehicle, viz., whether the steering input device actuator and the steerable wheels actuator(s) and hence the steering input device and steerable wheels are synchronously positioned. If the steering input device actuator and the steerable wheel actuator are synchronously positioned, then control is passed from initial condition 232 to a command 234 that disengages the steerable wheel actuator(s) lock(s) and then to a run command 236 from which normal operation of the vehicle is derived.

If, however, the control unit evaluates initial condition 232 and determines that the steering input device actuator and the steerable wheel actuator(s) are not synchronously positioned, then control is passed to an alarm command 238 and to a disengagement command 240 that causes the disengagement of the lock on the steerable wheel actuator (s). Control is then passed to an adjustment command 242, which causes the position of the steering input device actuator and/or the position of the steerable wheel actuator (s) to be altered to result in the steering input device, the steering input device actuator, the steerable wheel actuator, and the steerable wheel to be synchronously positioned. Once the steering input device and the steerable wheel are synchronously positioned, control is passed to run command 236 and vehicle is operated.

As above, adjustment command 242 may be effectuated in any one of a number of different operations. For example, in one operation, adjustment command 242 may cause the steering input device actuator to be adjusted to register with the position of the steerable wheel actuator(s). In another operation, adjustment command may adjust the steerable wheel actuator(s) to register with the position of the steering input device actuator. In still another operation, one or both the steering input device actuator and the steerable wheel actuator(s) can be adjusted, thereby aligning the steering input device actuator and the steerable wheel actuator(s) to synchronous positions. Furthermore, if the vehicle includes steerable wheels that are independently actuatable, each steerable wheel actuator can be adjusted to align with each other and with the steering input device actuator.

Referring now to FIG. 11, a flowchart representation of the shutdown of system 210 is illustrated generally at 270. Shutdown 270 comprises a command 272 to turn the ignition switch off, a subsequent command 274 to engage a lock(s) on the steerable wheel actuator(s), thereby preventing the movement of the steerable wheels and movement of the steerable wheel actuator(s), and a final command 276 to turn the computer off. Command 272 can be executed to turn the ignition switch off only if the vehicle speed is zero.

Referring to FIG. 12, an exemplary system in which neither an actuator of a steering input device nor an actuator (s) of a steerable wheel lock either separately or together is shown generally at 310 and is hereinafter referred to as "system 310." System 310 comprises a steering input device 312 disposed in controllable communication with steerable wheels 314 through a steerable wheel actuator(s) 316 associated with steerable wheels 314 and a steering input device actuator 318 associated with steering input device 312. Both actuators 316, 318 are disposed in electronic communication with each other through a control unit 320. Control unit 320, as above, is integrated with a computer 325 and also includes an ignition switch 322. System 310 further comprises a failsafe mechanism and an alarm 324 similar to those described with reference to FIGS. 1 through 11. Although system 310 is similar in numerous aspects to systems 10, 110, and 210 as defined with reference to FIGS. 1 through 11 and comprises similar elements, steerable wheel actuator(s) 316 and steering input device actuator 318 are not lockable. Therefore, the movement of the steering input device 312 as well as the movement of steerable wheels 314 is uninhibited when a vehicle (not shown)

having steer-by-wire capability into which system 310 is incorporated is non-operational.

In system 310, the positions of actuators 316, 318 are registered at startup of the vehicle. If actuators 316, 318 are not synchronously positioned, alarm 324 alerts the operator. Correction of such condition to put actuators 316, 318 into synchronous positions can then be made in a manner similar to that described above with reference to FIGS. 1 through 11 but without disengagement of locks disposed on either of the actuators.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A steer-by-wire steering system for a vehicle, the system comprising:
   a steering input device actuator operably connected to a steering input device of the vehicle; and
   a steerable device actuator operably connected to a steerable device of the vehicle, said steerable device actuator being disposed in electronic communication with said steering input device actuator, the electronic communication being maintained through a control unit, the control unit being configured to reposition at least one of said steering input device actuator and said steerable device actuator upon startup of the vehicle so that they are synchronized in relation to one another independent of any actuation of the steering input device to effect such position synchronization.

2. The steering system of claim 1 further comprising a locking system disposed in operable communication with at least one of said steering input device actuator and said steerable device actuator.

3. The steering system of claim 2 wherein the control unit engages the locking system during vehicle shutdown.

4. A steerable device synchronization system for a steer-by-wire steering system for a vehicle, the system comprising:
   a steering input device positioned to be controllable by an operator of the vehicle;
   a steering input device actuator disposed in operable communication with said steering input device;
   a steerable device actuator;
   a steerable device disposed in operable communication with said steerable device actuator; and
   a control unit disposed in electronic communication with said steering input device actuator and said steerable device actuator, said control unit being configured to provide electronic communication between said steering input device actuator and said steerable device actuator, said control unit operating at least one of said steerable device actuator and said steering input device actuator upon vehicle start-up, thereby effectuating the synchronous positioning of said steerable device with respect to said steering input device.

5. The steering system of claim 4 further comprising a locking system disposed in operable communication with both said steering input device actuator and with said steerable device actuator, said locking system being actuatable by said control unit when the vehicle is not operational.

6. The steering system of claim 5 wherein said locking system is configured to retain said steering input device actuator and said steerable device actuator in a predefined relationship with each other.

7. The steering system of claim 6 wherein said predefined relationship comprises a relation between a position of said steerable device and a position of said steering input device as defined by said control unit.

8. The steering system of claim 5 wherein said locking system is automatically disengaged upon startup of the vehicle and automatically engaged upon shutdown of the vehicle.

9. The steering system of claim 5 wherein said locking system is manually disengaged upon startup of the vehicle.

10. The steering system of claim 5 wherein said locking system includes a failsafe mechanism to prevent the inadvertent locking of said steering input device and said steerable device during operation of the vehicle.

11. The steering system of claim 4 further comprising a locking system disposed in operable communication with said steering input device actuator, said locking system being actuatable when the vehicle is not operational.

12. The steering system of claim 4 further comprising a locking system disposed in operable communication with said steerable device actuator, said locking system being actuatable when the vehicle is not operational.

13. The steering system of claim 4 wherein said control unit is actuatable in response to operation of a switching device.

14. The steering system of claim 4 wherein said control unit is in electronic communication with an alarm.

15. A method of synchronizing steerable devices with a steering input device in a steer-by-wire steering system of a vehicle, the method comprising:
   activating the system by turning on an ignition switch of the vehicle;
   determining whether a steerable device actuator of the vehicle is synchronously positioned relative to a steering input device actuator of the vehicle; and
   if said steerable device actuator and said steering input device actuator are unsynchronized, repositioning at least one of said steerable device actuator and said steering input device actuator so that they are synchronized in relation to one another independent of any actuation of the steering input device to effect such position synchronization.

16. The method of claim 15 wherein said method further comprises:
   adjusting a position of said steerable device actuator of the motor vehicle to comport with a position of said steering input device actuator of the vehicle when said steerable device actuator is determined to not be synchronously positioned relative to said steering input device actuator.

17. The method of claim 16 wherein said adjusting of said position of said steerable device actuator of the vehicle comprises:
   locking said steerable device actuator and said steering input device actuator of the vehicle upon deactivating the system;
   unlocking said steerable device actuator of the vehicle;
   altering said position of said steerable device actuator of the vehicle such that said position of said steerable device actuator corresponds wit said position of said steering input device actuator; and
   unlocking said steering input device actuator of the vehicle.

18. The method of claim 15 wherein said method further comprises:
   adjusting a position of said steering input device actuator of the vehicle to comport with a position of said steerable device actuator of the vehicle when said steerable device actuator is determined to not be synchronously positioned relative to said steering input device actuator.

19. The method of claim 18 wherein said adjusting of said position of said steering input device actuator of the vehicle comprises:

locking said steering input device actuator of the vehicle upon deactivating the system;

unlocking said steering input device actuator of the vehicle;

altering said position of said steering input device actuator of the vehicle such that said position of said steering input device actuator corresponds with said position of said steerable device actuator; and unlocking said steerable device actuator of the vehicle.

20. The method of claim 15 wherein said method further comprises:

adjusting positions of bath said steerable device actuator of the vehicle and said steering input device actuator of the vehicle such that said positions of said steerable device actuator and said steering input device actuator correspond when said steerable device actuator is determined to not be synchronously positioned relative to said steering input device actuator.

21. The method of claim 20 wherein said adjusting of said position of said steerable device actuator of the vehicle and said steering input device actuator of the vehicle comprises:

locking said steerable device actuator and said steering input device actuator of the vehicle upon deactivating the system;

unlocking both said steering input device actuator of the vehicle and said steerable device actuator of the vehicle; and altering said positions of said steering input device actuator and said steerable device actuator such that said position of said steering input device actuator and said position of said steerable device actuator correspond.

* * * * *